United States Patent
Hayden et al.

(10) Patent No.: US 11,376,679 B2
(45) Date of Patent: Jul. 5, 2022

(54) BANDSAW BLADE

(71) Applicant: BICHAMP CUTTING TECHNOLOGY (HUNAN) CO., LTD, Changsha (CN)

(72) Inventors: Robert Hayden, Changsha (CN); Xiru Guo, Changsha (CN)

(73) Assignee: BICHAMP CUTTING TECHNOLOGY (HUNAN) CO., LTD, Changsha (CN)

( * ) Notice: Subject to any disclaimer, the term of this patent is extended or adjusted under 35 U.S.C. 154(b) by 0 days.

(21) Appl. No.: 17/252,625

(22) PCT Filed: Jun. 27, 2019

(86) PCT No.: PCT/CN2019/093228
§ 371 (c)(1),
(2) Date: Dec. 15, 2020

(87) PCT Pub. No.: WO2020/258141
PCT Pub. Date: Dec. 30, 2020

(65) Prior Publication Data
US 2022/0105580 A1    Apr. 7, 2022

(51) Int. Cl.
*B23D 61/12*    (2006.01)
(52) U.S. Cl.
CPC ................... *B23D 61/121* (2013.01)
(58) Field of Classification Search
CPC .. B23D 61/121; B23D 61/021; Y10T 83/9358
See application file for complete search history.

(56) References Cited

U.S. PATENT DOCUMENTS

| 5,331,876 A | 7/1994 | Hayden, Sr. |
| 5,832,803 A | 11/1998 | Hayden, Sr. |

(Continued)

FOREIGN PATENT DOCUMENTS

| CN | 104507612 A | 4/2015 |
| DE | 9321337 U1 | 8/1997 |

(Continued)

OTHER PUBLICATIONS

English abstract of EP 1204505 A1 (2001).

(Continued)

*Primary Examiner* — Stephen Choi
(74) *Attorney, Agent, or Firm* — Caesar Rivise, PC

(57) ABSTRACT

A bandsaw blade, including a main tooth group formed by nine sawteeth arranged in sequence, including three sub-tooth groups including a first sawtooth (1,4,7) of straight tooth, a second sawtooth (2,5,8) of left set tooth and a third sawtooth (3,6,9) of right set tooth. Each of sawteeth (1) and (4)-(6) has chamfers on two sides. Sawtooth (1) has a first height, sawtooth (4) has a second height and sawtooth (7) has a third height. Sawteeth (5) and (6) have the same fourth height. Sawteeth (2), (3), (8) and (9) have the same fifth height. The first through fifth heights are sequentially decreased. A top plane width of sawtooth (4) is larger than that of sawtooth (1). A top plane width of sawtooth (7) is larger than that of sawtooth (4). By using the bandsaw blade, more chips can be produced to reduce total cutting force and improve cutting efficiency.

13 Claims, 5 Drawing Sheets

(56) References Cited

U.S. PATENT DOCUMENTS

| | | | |
|---|---|---|---|
| 8,695,470 | B2 | 4/2014 | Kullmann et al. |
| 9,821,391 | B2 | 11/2017 | Tsujimoto et al. |
| 2001/0004860 | A1* | 6/2001 | Kullmann ............ B23D 61/021 83/846 |
| 2005/0257660 | A1 | 11/2005 | Hayden |
| 2012/0055313 | A1* | 3/2012 | Nagano ................ B23D 61/121 83/835 |
| 2012/0279372 | A1* | 11/2012 | Kullmann ............ B23D 61/121 83/846 |
| 2015/0151372 | A1* | 6/2015 | Tsujimoto .............. B23D 65/00 83/847 |
| 2018/0099341 | A1 | 4/2018 | Rakurty et al. |

FOREIGN PATENT DOCUMENTS

| | | |
|---|---|---|
| EP | 1204505 B1 | 4/2003 |
| EP | 1586401 A1 | 10/2005 |
| EP | 1470884 B1 | 12/2007 |
| EP | 2277652 A2 | 1/2011 |
| EP | 2277652 A3 | 2/2013 |
| EP | 2570216 A1 | 3/2013 |

OTHER PUBLICATIONS

English Abstract for EP 2570216 A1 (2013).
International Search Report for PCT/CN2019/093228 dated Mar. 27, 2020.

* cited by examiner

BANDSAW BLADE

CROSS-REFERENCE TO RELATED APPLICATIONS

This application is a U.S. National Phase Application of PCT/CN2019/093228, filed Jun. 27, 2019, the contents of which are incorporated herein by reference in their entireties for all purposes.

FIELD OF THE INVENTION

The present invention relates to a bandsaw blade, belongs to the field of metal sawing tools, and in particular relates to a hard alloy bandsaw blade for sawing nickel-based alloy that is difficult to cut.

BACKGROUND OF THE INVENTION

In order to achieve the purpose that a cutting force is remarkably reduced when a large material difficult to cut is sawed, technicians in the industry make various efforts, such as adopting a non-set triple chip tooth, but the cutting force is not obviously reduced due to the fact that the method is limited by the number of teeth in a period. In some cases, a back edge is made into a corrugated shape, so that an average cutting force on each tooth is increased while a total cutting force is not changed or reduced, and the problem that too many cutting teeth of the non-set triple chip tooth participate in cutting is solved. For example, when the tooth is used for sawing a large forged Inconel 718 material, the material has large residual internal stress therein, so that it is liable to cause saw clamping and other phenomena in sawing; and such kind of material is very expensive, once sawing is started, the material must be sawed off, and otherwise, the material is wasted and high cost loss is caused. In order to solve the problem of saw clamping, a set type saw blade may increase a tooth set to widen a cutting, and a welded hard alloy tooth tip needs to be larger for the non-set type, but the enlarged hard alloy tooth tip is easier to break. This increases the risk of tooth strippage which is a fundamental weakness of non-set type products.

A bandsaw blade is mainly used for sawing metal bars and section bars, and has the advantages that compared with a disk saw, the bandsaw blade is small in kerf and does not waste the material; and when being used for cutting off large Inconel alloy, a grinding wheel may cause a large amount of precious material loss due to the too wide kerf, but the bandsaw blade does not have this disadvantage. The application disadvantage of the bandsaw blade is that when sawing resistance exceeds a feeding force of the bandsaw blade, the bandsaw blade gradually loses torsional rigidity and thus is likely to incline. In this regard, this means that some adjustments should be made to the tooth profile of the bandsaw blade to reduce the feeding force; such design includes designing some tooth tips to be higher and longer to achieve a straight sawing guide effect in cutting, and designing the tooth tips to have different heights, separating chips transversely, but thickening the cutting shoulder. The most typical tooth profile of such concept is the non-set triple chip tooth profile, for example.

The only method for reducing the cutting resistances on two sides is to make the maximum cutting resistance appears on left and right sides in a pair. If the distance between the resistances appearing in pairs is small enough to allow the resistance to occur simultaneously in cutting, the two forces may achieve a mutual balance. However, if the distance is small enough, it means that the large number of teeth saw at the same time, and it also means that the total feeding force is increased when a large solid material is sawed.

Due to characteristics of the geometrical shape that the bandsaw blade is thin and long, it means that rigidity of the back of a knife handle is low. Another problem in cutting is that many feeding component forces of the saw blade with low back rigidity occur simultaneously, if each piece of tooth pitch is the same, the distance of each component force is also the same, and thus vibration, noise, roughening, and reduced service life of the saw blade may be caused. The service life of the saw blade is reduced because the edge of the tooth tip is damaged by vibration, and a cutting edge of a hard alloy is particularly sensitive to vibration. If only the few teeth perform cutting at the same time, the cutting resistance is not well balanced, and thus ripples are caused on the surface of a workpiece. From U.S. Pat. No. 4,784,033 in 1988, a new tooth profile is specially designed for the ripple problem of the workpiece to overcome the problem that the cutting resistances on the two sides are unequal; the cutting resistances on the two sides are applied to the same tooth at the same time, so that a machining face of the workpiece becomes smooth.

Due to low rigidity of the knife handle of the bandsaw blade, the design of the bandsaw blade is difficult to optimize even under a specific sawing condition, let alone being used for sawing the materials which are large and difficult to cut under complex conditions. In order to solve the problem of sawing the materials which are large and difficult to cut, many attempts are made by predecessors. The design mode of high teeth and low teeth of the tooth tips is not only used for guiding, but also enables more cutting tasks to be distributed to the several longer teeth on the premise of reasonable sawing efficiency when hard materials are sawed; and all the teeth can participate in cutting when soft materials are sawed.

Variable tooth pitch may reduce vibration and make the pairs of teeth of equal height to cut simultaneously without simultaneous participation of more teeth in cutting. By setting different tooth sets, the chip may be divided into a plurality of pieces with improved chip formation of thicker and narrower dimensions. A tooth setting logic of the bandsaw blade is generally as follows: straight teeth, right set teeth and left set teeth (the left teeth and the right teeth appear in pairs), but usually five or more teeth participate in cutting, and the low teeth often have higher tooth sets than the high teeth.

Under a normal condition, a tooth profile period is to machine the tooth profile through tooth grinding, tooth milling and tooth punching, and a tooth setting machine is used for setting the teeth of the saw blade. Larger equipment is needed for machining for the too long tooth profile period, the larger the equipment is, the more expensive it is, and perhaps no manufacturer is capable of providing such equipment.

Three different technologies such as high-low teeth, variable tooth pitch and variable tooth set are applied to U.S. Pat. Nos. 4,727,788, 5,832,803, 5,331,876, 4,727,788 and 6,119,571 to solve the problem that the large materials are difficult to saw. However, a tooth profile manufacturing process described in U.S. Pat. No. 4,727,788 is too complex, and the manufacturing costs of improved products claimed in most patents are too high, which is not beneficial to product competition.

SUMMARY OF THE INVENTION

In order to saw nickel-based alloy that is difficult to cut and generate chips as much as possible in a sawing process to reduce a total cutting force, the present invention provides a bandsaw blade that has the specific technical scheme as follows.

The bandsaw blade includes a saw blade body and sawteeth located on the saw blade body, wherein nine sawteeth arranged in sequence form a main tooth group; each main tooth group includes a first sub-tooth group, a second sub-tooth group and a third sub-tooth group; and each sub-tooth group includes a first sawtooth, a second sawtooth and a third sawtooth which are sequentially arranged, the first sawtooth is a straight tooth, and the second sawtooth and the third sawtooth are a left set tooth and a right set tooth respectively;

a first sawtooth of the first sub-tooth group has a first height, and is provided with chamfers on two sides; a first sawtooth of the second sub-tooth group has a second height, and is provided with chamfers on two sides, and the width of the top plane of the first sawtooth of the second sub-tooth group is larger than that of the first sawtooth of the first sub-tooth group; a first sawtooth of the third sub-tooth group has a third height, and the width of the top plane of the first sawtooth of the third sub-tooth group is larger than that of the first sawtooth of the second sub-tooth group;

second and third sawteeth of the first sub-tooth group and second and third sawteeth of the third sub-tooth group have a same fifth height; second and third sawteeth of the second sub-tooth group have a fourth height, and are provided with chamfers on the outer sides;

the first height, the second height, the third height, the fourth height and the fifth height are sequentially decreased.

Furthermore, the sawteeth include cutting edges made of hard alloy sectional bars.

Furthermore, the first height, the second height, the third height, the fourth height and the fifth height are sequentially decreased in an arithmetic progression.

Furthermore, the width of the top plane of the first sawtooth of the first sub-tooth group is equal to 20-30% of the thickness of the saw blade, preferably 25%.

Furthermore, the width of the top plane of the first sawtooth of the second sub-tooth group is equal to 60-70% of the thickness of the saw blade, preferably 66%.

Furthermore, the first sawtooth of the third sub-tooth group is not provided with chamfer.

Furthermore, none of the second and third sawteeth of the first sub-tooth group and the second and third sawteeth of the third sub-tooth group is provided with chamfer.

Furthermore, all the above-mentioned chamfers are the chamfers of 45 degrees; and the widths of the chamfers of the second and third sawteeth of the second sub-tooth group are ½ of the tooth set.

Furthermore, a rear angle of the sawtooth is between 10 and 30 degrees, preferably 25 degrees; and a rake angle of the sawtooth is between 0-15 degrees, preferably 10 degrees.

Furthermore, the bandsaw blade adopts fixed tooth pitch or variable tooth pitch. The number of teeth per inch (TPI) may be any number in a geometric pattern of the bandsaw blade.

Furthermore, the arrangement sequence of the first, second, and third sub-tooth groups may be not limited, and the first, second, and third sub-tooth groups may be arranged in any sequence without affecting the number or size of the chips or cutting capacity.

When the bandsaw blade cuts the large material that is difficult to cut, the chip is divided into 11 pieces by chamfering different tooth parts, so that the cutting force is reduced when the bandsaw blade is used for cutting the large nickel-based alloy that is difficult to cut, such as Inconel 718. Pieces of chips may be generated as much as possible to reduce the total cutting force; when the band saw blade in the present invention is used for cutting, under the condition of same cutting efficiency, the average cutting force of each tooth is lower, and the generated chips are narrow and thick.

DETAILED DESCRIPTION OF THE EMBODIMENTS

Figure 1:
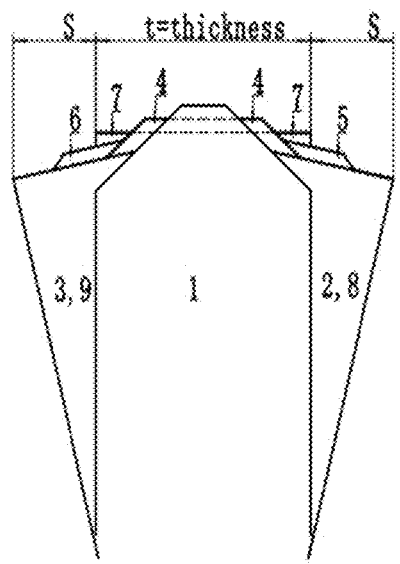
FIG. 1 is a schematic diagram of the cross section of the tooth profile of a bandsaw blade provided by the present invention.
Figure 2:
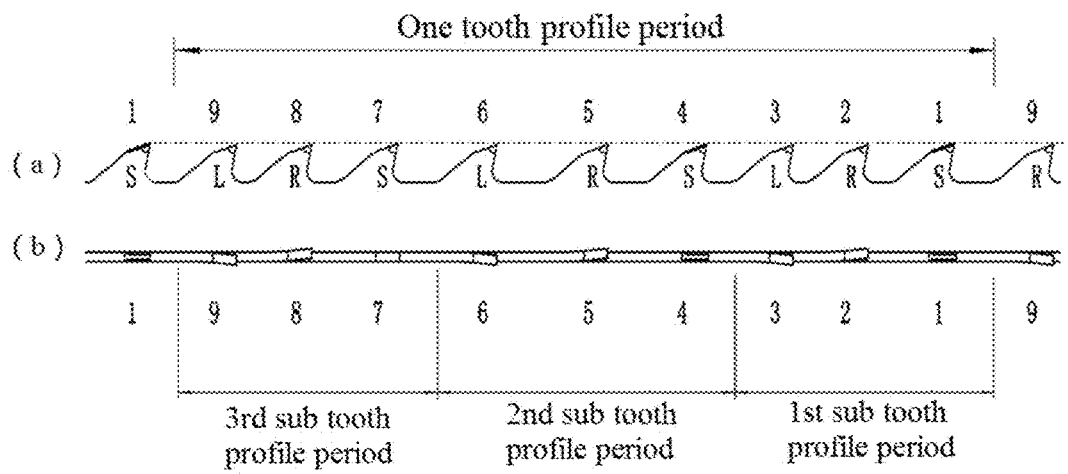
FIG. 2(a) is a front view of a band saw blade provided by the present invention (the height of each sawtooth is not indicated)
FIG. 2(b) is a top view of a bandsaw blade of the present invention.
Figure 3:
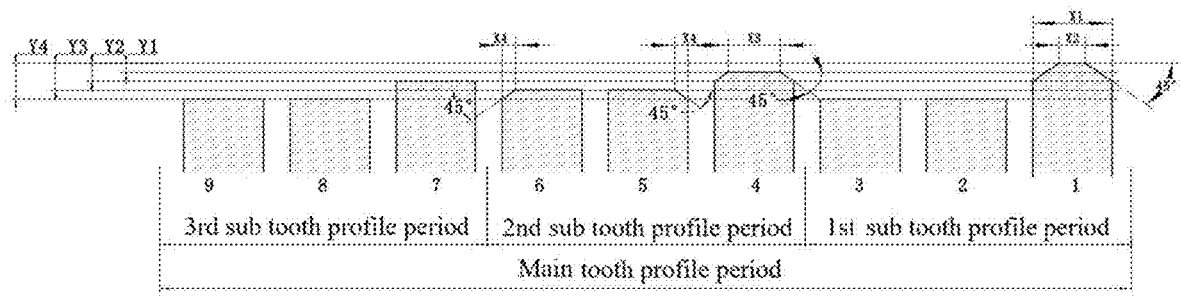
FIG. 3 is a front view of each tooth of the present invention after grinding.

The present invention is described in further detail below in combination with accompanying drawings:

Referring to FIG. 1-FIG. 3, and FIG. 12, in a hard alloy bandsaw blade provided by the present invention, nine sawteeth forms a main period (nine sawteeth forms a main tooth group), each three sawteeth form a sub-period (three sawteeth forms a sub-tooth group), and each sub-period includes a straight guide tooth, a left set tooth, a right set tooth arranged in sequence (in FIG. 2, S: non-set straight tooth, L: leftward set tooth, and R: rightward set tooth). The nine sawteeth have five tooth heights; the tooth heights refer to the heights of tooth tips of the sawteeth, and are divided into a first-level height to a fifth-level height from high to low, preferably, step differences between the levels of height are the same (in FIG. 3, Y1-Y4 refer to the height differences between the teeth, and the height difference of each level is the same), and the nine sawteeth have four tooth tip shapes. The four tooth tip shapes are as follows:

first type: the straight tooth without chamfer;
second type: the straight tooth with chamfers on two sides;

third type: the set tooth with chamfer on the outer side; and fourth type: the set tooth without chamfer.

In the main period, No. 1 tooth is the highest tooth, the tooth tip height belongs to the first level, the No. 1 tooth is of the second-type tooth tip shape, and the width X2 of the unchamfered part of the No. 1 tooth is 25% of the thickness X1 of the saw blade.

The following No. 2 and No. 3 teeth belong to the fourth type tooth tip type, the heights of the No. 2 and No. 3 belong to the fifth level, and the two teeth are symmetrical left and right set teeth.

No. 4 tooth is the second-type straight tooth, and the height level of the tooth is one less than that of the No. 1 tooth, and belongs to the second level. The width X3 of the unchamfered part of the No. 4 tooth is 66% of the thickness X1 of the bandsaw.

No. 5 and No. 6 teeth are the third type tooth tip type, respectively being a left set tooth and a right set tooth, and the heights of the tooth tips belong to the fourth level that is one more than the height level of the No. 2 and No. 3 teeth. One side of each of the No. 5 and No. 6 teeth is chamfered, and the width X4 of the chamfer is 50% of a tooth set S.

No. 7 tooth is the first-type straight tooth, and the height of the tooth tip belongs to the third level.

No. 8 and No. 9 teeth are the first tooth tip type, respectively being a left set tooth and a right set tooth, the heights of the tooth tips belong to the fifth level, and the tooth sets and heights of the No. 8 and No. 9 teeth are the same as those of the No. 2 and No. 3 teeth.

The No. 1, No. 2 and No. 3 teeth form the first sub-tooth group; the No. 4, No. 5 and No. 6 teeth form the second sub-tooth group; and the No. 7, No. 8 and No. 9 teeth form the third sub-tooth group. It should be noted that the arrangement mode of the first sub-tooth group, the second sub-tooth group and the third sub-tooth group may be randomly combined, and the cutting number or size or cutting capacity may not be affected.

The tooth profile of the present invention is not necessarily related to the tooth profile on a back material formed by tooth milling (or other processing methods) before the hard alloy head is welded; for example, a tooth profile period formed by tooth milling may include seven teeth or five teeth. Therefore, if the tooth profile period after the tooth tip of the back material is shaped includes seven teeth, and a tooth tip grinding period is designed according to the present invention, one tooth profile period of the saw blade actually includes 64 teeth. Due to the fact that the tooth milling period and the tooth grinding period are inconsistent, the No. 1 grinding tooth tip needs to be separated from the other one by 64 teeth in the same tooth profile formed through tooth milling.

Another change of the present application is to adjust the rear angle from the traditional angle of 20 degrees to the angle of 25 degrees; since 1986, the angle of 20 degrees adopted by the tooth tip rear angle of the hard alloy bandsaw blade is mainly for preventing overlarge vibration in sawing caused by large rear angle; however, by trying to cut Inconel 718 on site, the tooth profile designed by the present invention is proved that the rear angle of 25 degrees will not cause overlarge vibration. Increasing the rear angle is also to further reduce the cutting force.

The main objective of the present application is to generate pieces of chips as much as possible so as to reduce the total cutting force. When the tooth profile is used for cutting, under the condition of same cutting efficiency, the average cutting force of each tooth is lower, and the generated chips are narrow and thick.

Another objective of the present application is also different from that of a tooth profile disclosed in U.S. Pat. No. 5,832,803 which can deal with current materials that are larger and more difficult to cut. Of course, the situation that the product of U.S. Pat. No. 5,832,803 can exist in the market for more than 20 years is based on successful design of the product, which is not an update version of the design of U.S. Pat. No. 5,331,871, but another concept.

The design purpose of the tooth profile of the present application is to reduce the cutting force and then reduce the loss of tension on a cutting edge. This improves sawing quality and prolongs the service life of the bandsaw.

Analysis and comparison on the cutting forces of the bandsaw blade tooth profile of the present application and other tooth profiles Most attention of most tooth profile patent specifications related to reducing the cutting force is to generate various geometrical shapes of teeth with multiple chips but never analyzing principles thereof, and to leave performance assessment to examiners of patent applications and end users, making them to accept these claims as a fact.

The following is to analyze, in principle, how various tooth profiles affect the cutting force. Firstly, the relationship between the chip thickness and the cutting force required to form the chip must be understood. In 2002, M. Sarwar, H. Hellberg, A. R, Doraisingam, and M. Persson proposed a paper titled "Simulation of the Intermittent Cutting Action of a Bandsaw Blade" in the International Conference on Flexible Automation and Intelligent Manufacturing, Dresden, Germany. The study is finished at the Engineering School, University of Northumbria at Newcastle, UK.

The study essentially researches the relationship between the cutting force generated in sawing and the chip thickness. A single tooth cut specimen is mounted on a rotating fixture on a lathe. Instruments mounted on a single tooth holder measure the cutting forces and feeding forces. One figure of the paper is shown in FIG. 4 of the application.

Inventors of the present application are Mr. Hellberg and Mr. Persson, colleagues who worked together for 15 years from 1991 to 2006. During such period, Empirical rule considered that the chip thickness is doubled but the cutting force is only increased by 60%. Sawing tests on all types of materials have proven this theory over the years, and the bandsaw blades in the tests include bimetal and hard alloy tip bandsaw blades. Based on results of the study and results of the tests, a relationship curve between the cutting force and the chip thickness in FIG. 5 is summarized.

In the figure, the chip depth on a transverse axis and the cutting force on a longitudinal axis are standardized. A standard chip thickness value "1.0" represents the recommended per-tooth cutting depth of the bandsaw when a specific material is cut. A standard cutting force "1.0" refers to the force (hereinafter a unit cutting force) required for cutting the standardized chip thickness "1.0" of the specific material by a 1 mm wide single tooth.

Figure 4:
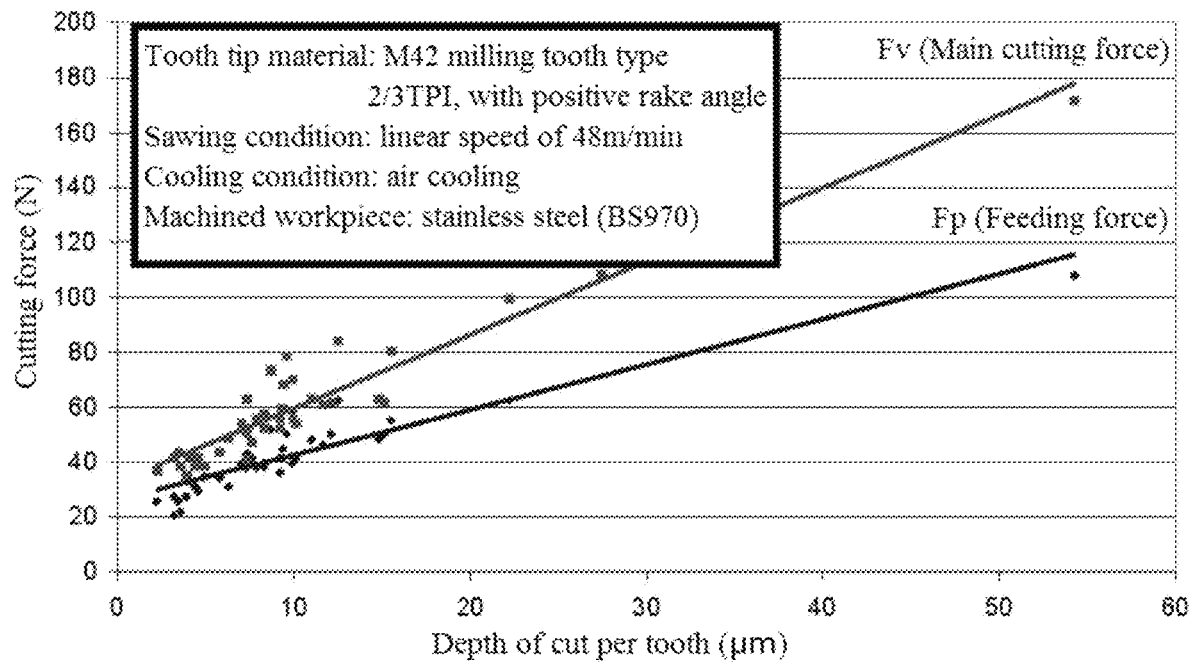
FIG. 4 is a chart of the paper "the relationship between cutting force and chip thickness" published at the 12th International Flexible Automation Conference.
Figure 5:
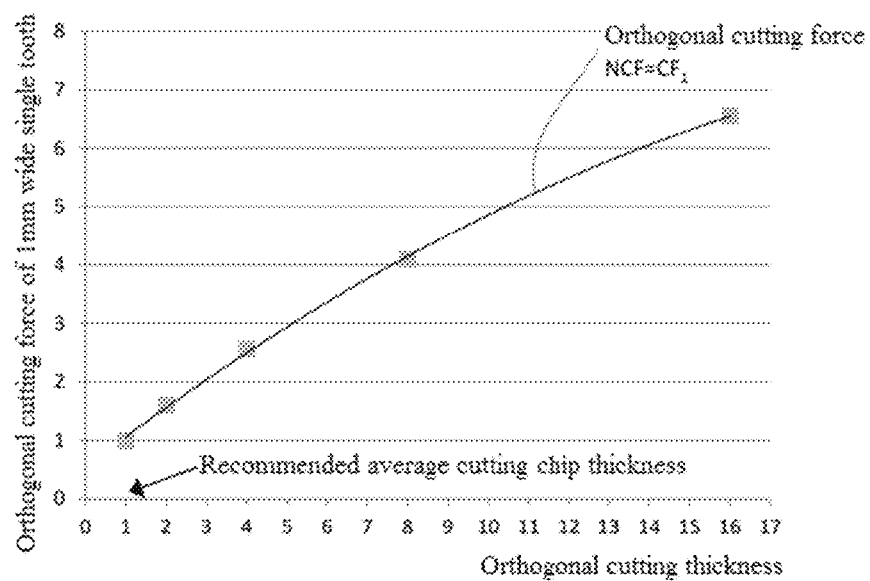
FIG. 5 is a standardized chart of the relationship between force and cutting depth.

The curve in FIG. 5 will be closely validated if the graph in FIG. 4 is normalized. The graph in FIG. 5 can be used for comparing relative cutting forces of various tooth profiles regardless of the materials to be cut.

Comparative analysis on the tooth profile designs of predecessors and the tooth profile of the present application will take sawing Inconel 718 as an example. The analysis is based on following parameters: the same cutting speed, the same feeding rate, the same kerf width that is equal to 2.6 mm, the same material and the same tooth pitch.

Figure 6:
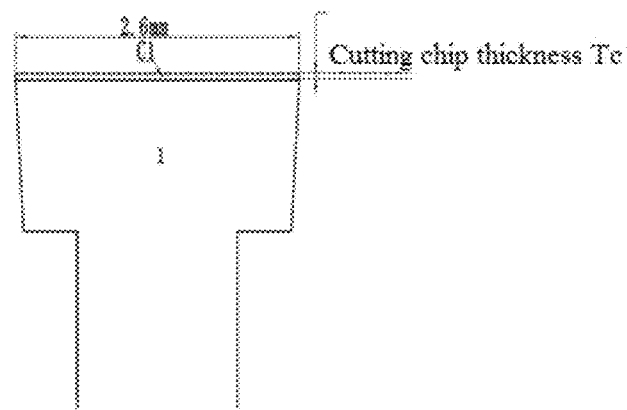
FIG. 6 is a schematic diagram of per-tooth cutting of a standardized flat tooth.

FIG. 6 is a schematic diagram of cutting of a flat tooth, in which C1 refers to the first piece of generated chip, and the chip thickness tc=1.0, F=1.0 f/mm f: one unit cutting force represented by the chip width per mm Ft=(2.6)×F=2.6 f the average per-tooth cutting force is 2.6 f.

Figure 7:
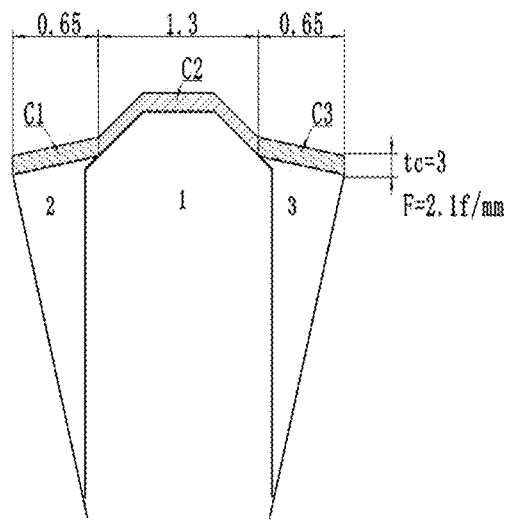
FIG. 7 is a schematic diagram of per-tooth cutting of a standardized triple set tooth.

FIG. 7 is a schematic diagram of cutting of triple set tooth profiles such as Bahco 3868 TSX, Lenox Tri Tech and Bichamp CB MP, in which C1-C3 refer to three pieces of generated chips, Ft=((2)×(0.65)×(2.1)+(1.3)×(2.1)) f Ft=2.73+2.73=5.46 f the average per-tooth cutting force=the total cutting force/the total number of teeth=5.46 f/3=1.82 f.

Figure 8:
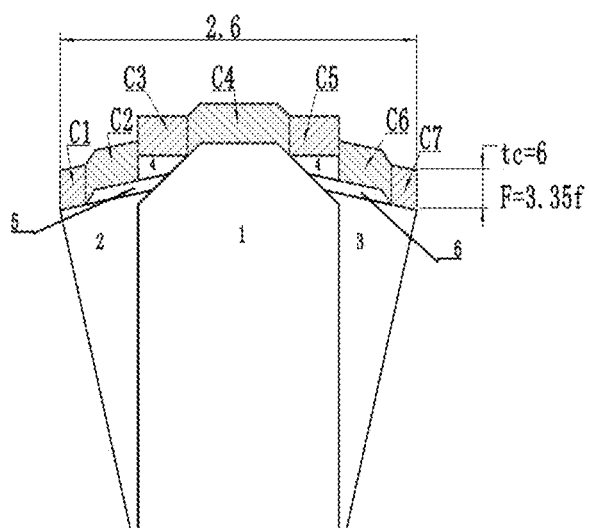
FIG. 8 is a schematic diagram of standardized per-tooth cutting of Bahco 3881 THQ and Bichamp CB PRO type teeth.

FIG. 8 is a schematic diagram of cutting of sextuple set tooth profiles such as Bahco 3881 THQ and Bichamp CB PRO, in which C1-C7 refer to seven pieces of generated chips, Ft=(2.6)×(3.35)=9.1 f the average per-tooth cutting force=the total cutting force/the number of teeth=9.1 f/6=1.516 f.

Figure 9:
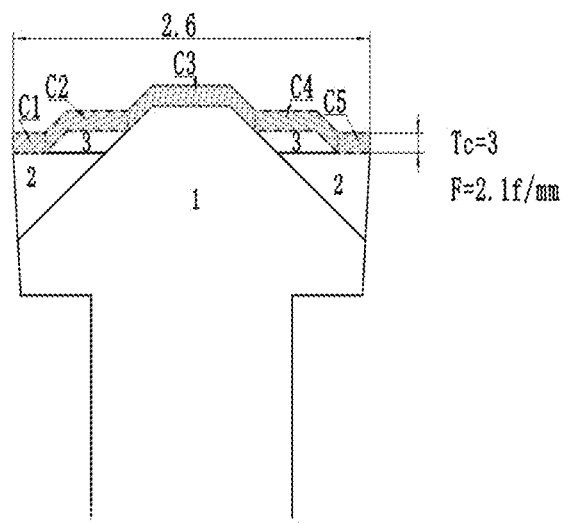
FIG. 9 is a schematic diagram of standardized per-tooth cutting of Lenox Cast Master.

FIG. 9 is a schematic diagram of a three-tooth non-set type tooth profile of Lenox Cast Master, in which C1-C5 refer to five pieces of generated chips, Ft=(2.6)×(2.1)=5.46 f the average per-tooth cutting force=the total cutting force/the number of teeth=5.46 f/3=1.82 f.

Figure 10:
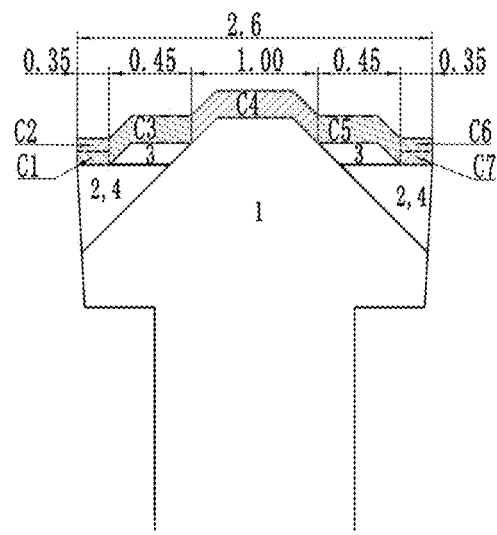
FIG. 10 is a schematic diagram of standardized per-tooth cutting of Wikus 542 non-set tooth profile.
Figure 11:
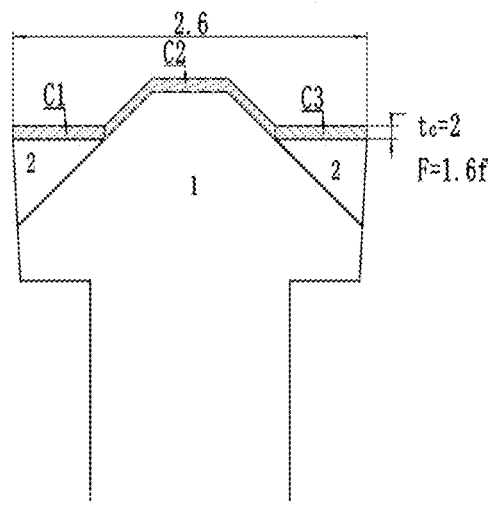
FIG. 11 is a schematic diagram of standardized per-tooth cutting of standard triple chip non-set tooth profile.
Figure 12:
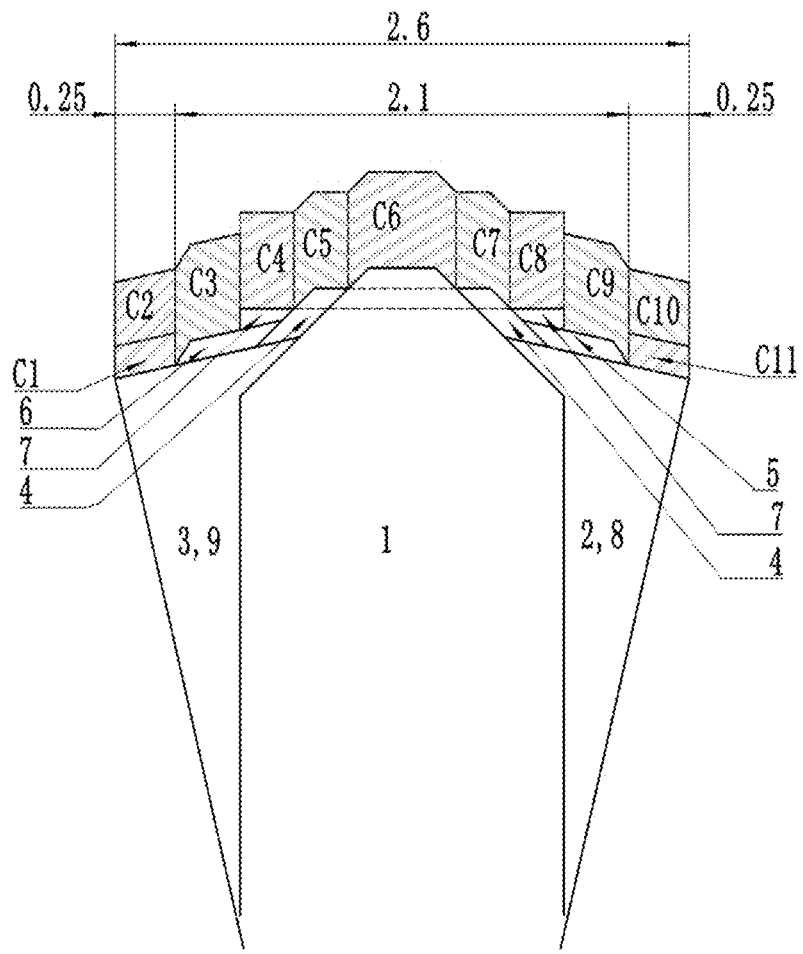
FIG. 12 is a schematic diagram of standardized per-tooth cutting of a tooth profile provided by the present invention.

FIG. 10 is a schematic diagram of cutting of the non-set type tooth profile of Wikus 542, in which C1-C7 refer to seven pieces of generated chips, Ft=((1)×(2.56)+(2)×(0.45)×(2.56)+4×(0.35)×(2.1)) f=(2.56+2.304+2.24) f Ft=7.104 f the average per-tooth cutting force=the total cutting force/the number of teeth=7.104 f/4=1.776 f FIG. 11 is a schematic diagram of cutting of a standard triple chip non-set tooth profile, in which C1-C3 refer to three piece of generated chips, Ft=(2.6)×(1.6)=4.16 f the average per-tooth cutting force=the total cutting force/the number of teeth=4.16 f/2=2.08 f FIG. 12 is a schematic diagram of cutting of a tooth profile provided by the present application, in which C1-C11 refer to eleven pieces of generated chips, the chip thickness is tc chip (3, 4, 5, 6, 7, 8, 9) tc=9, F=4.5 f chip (2,10) tc=6, F=3.35 f chip (1,11) tc=3, F=2.1 f Ft=((2.1)×(4.5)+(2)×(0.25)×(2.1)+(2)×(0.25)×(3.3.5)) f=(9.45+1.05+1.675) f Ft=12.175 f the average per-tooth cutting force=the total cutting force/the number of teeth=12.175 f/9=1.352 f At last, the average per-tooth cutting force of each tooth profile is compared. The results are based on the lowest cutting forces of cutting tools, and the average per-tooth cutting forces of the seven tooth profiles are ranked from low to high, as shown in Table 1.

TABLE 1

Comparison on average per-tooth cutting forces of various tooth profiles

| Rank | Tooth Profile Name | Cutting Force | Tooth Set Type | Tooth Number per Period | Number of Generated Chip |
|---|---|---|---|---|---|
| 1 | the present application | 1.352 | set type | 9 | 11 |
| 2 | 3881 THQ | 1.516 | set type | 6 | 7 |
| 3 | Wikus 542 | 1.776 | non-set type | 4 | 7 |
| 4 | 3868 TSX | 1.82 | set type | 3 | 3 |
| 5 | Cast Master | 1.82 | non-set type | 3 | 5 |
| 6 | Triple chip | 2.08 | non-set type | 2 | 3 |
| 7 | Flat tooth | 2.6 | non-set type | 1 | 1 |

Obviously, the cutting force of the tooth profile provided by the present application is the lowest. It should be noted that if the cutting force is assumed to be linear, the chip thickness is twice the cutting force, and then all the teeth will have the same 2.6 units of cutting force. In addition, if it is considered that a tip clearance angle of the tooth profile of the present application is increased to 25 degrees, the cutting force is actually lower.

In the publication of US2005/257660A1, the inventor of the present application proposed two three-tooth set tooth profiles, who was a part-time employee of Bahco Tools at the time. Basically, the application is similar to the Bahco 3881 THQ tooth profile, which is labeled as 3868 TSP, using unchamfered flat teeth with smaller tooth sets in addition to chamfered teeth used for generating thin chip set teeth. The three-tooth set tooth profiles are tooth profile design samples proposed according to the standard Bahco 3868 TSX and 3881 THQ and wear resistance testing is carried out. 140 mm square 304 SS is used as a test workpiece. The initial cutting force of each saw blade is consistent with expectation, the TSX saw blade has the maximum force, and the THQ force and the TSP force are reduced by 80%. Interestingly, the new method of comparing tooth tip cutting forces has a similar comparison. TSX tooth profile completes cutting of 55 pieces, THQ completes 90 pieces, and TSP only completes cutting of 27 pieces. The TSP profile is considered to be failed, the item is canceled, and the patent application did not pass the examination. It was not understood at this time that the hard alloy saw blade is doomed to fail under the condition of multiple tooth set combinations, but bimetal does not have such a problem. The root cause is the difference between the rear angles of the saw blades, the rear angle of the hard alloy saw blade is usually 20 degrees, and the rear angle of the bimetal saw blade is 30 degrees. The angle in turn affects a torsion angle of the tooth tip, and the smaller the main rear angle is, the smaller the torsion angle is. The smaller the torsion angle is, the more easily the tooth tip is abraded by the edge, so that a higher transverse force and a lower transverse cutting capacity are caused, which is the reason that the TSP saw blade fails to work due to low tooth set.

The hard alloy saw blade which adopts a special tooth setting mode to set the teeth and keep the normal tooth set may twist tooth tips as much as possible to achieve an enough torsion angle and prevent untimely chip cutting. It is ironic that the concept of only using the chamfered teeth initially is mainly because tooth setting equipment cannot form multiple levels of tooth sets at that time. As further evidence, there is no hard alloy saw blade with multiple tooth setting levels on the market, and the high and low teeth of the bimetal bandsaw blade are multi-level set teeth.

Figure 13:
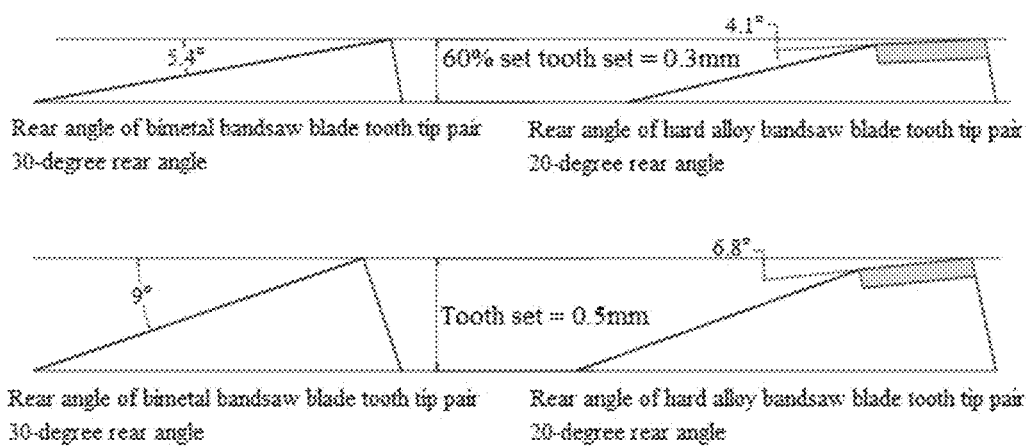
FIG. 13 refers to comparison between tooth setting torsion angles of tooth tips of a bimetal bandsaw blade and a hard alloy bandsaw blade.

In FIG. 13, the effect of the rear angle and the tooth set on the torsion angle is shown.

Experimental Testing

Experiments are carried out in a major Inconel manufacturer in China. The purpose is to successfully complete the cutting of the large Inconel 718 forging with the dimension exceeding 550 millimeters (21 inches). Previous attempts are made to saw by using a Triple Set type hard alloy blade produced by a U.S. Manufacturer and the task is not accomplished even three saw blades are used. In the test performed by using the Bichamp CB PRO bandsaw, cutting is performed once within 16 hours, but oblique cutting exists at lower third of the cutting.

When the bandsaw blade provided by the present application is used for sawing for the first time, sawing machining of the whole workpiece is successfully completed within 8 hours, and faults such as oblique cutting are avoided. Sawing time is not too long given that a bandsaw operator is very careful and conservative. And then a plurality of similar products are used for testing; and compared with other products, the present application is remarkably improved in sawing efficiency, sawing effect and sawing service life.

The embodiments of the present invention are described above in combination with the accompanying drawings, and embodiments and features of the embodiments of the present invention may be combined with each other in the case of no conflict. The present invention is not limited to the specific embodiments described above, which are merely illustrative and not limiting; and many forms may be made by those of ordinary skilled in the art without departing from the spirit of the present application and the scope of the claims under inspiration of the present invention, and these are all within the scope of the present invention.

The invention claimed is:

1. A bandsaw blade, comprising a saw blade body and sawteeth located on the saw blade body, wherein nine sawteeth arranged in sequence form a main tooth group; each main tooth group comprises a first sub-tooth group, a second sub-tooth group and a third sub-tooth group; and each sub-tooth group comprises a first sawtooth, a second sawtooth and a third sawtooth which are sequentially arranged, the first sawtooth is a straight tooth, and the second sawtooth and the third sawtooth are a left set tooth and a right set tooth respectively;

a first sawtooth of the first sub-tooth group has a first height, and is provided with chamfers on two sides; a first sawtooth of the second sub-tooth group has a second height, and is provided with chamfers on two sides, and the width of the top plane of the first sawtooth of the second sub-tooth group is larger than that of the first sawtooth of the first sub-tooth group; a first sawtooth of the third sub-tooth group has a third height, and the width of the top plane of the first sawtooth of the third sub-tooth group is larger than that of the first sawtooth of the second sub-tooth group;

second and third sawteeth of the first sub-tooth group and second and third sawteeth of the third sub-tooth group have a same fifth height; the second and third sawteeth of the second sub-tooth group have a fourth height, and are provided with chamfers on the outer sides; and the first height, the second height, the third height, the fourth height and the fifth height are sequentially decreased.

2. The bandsaw blade according to claim 1, wherein a cutting edge of each sawtooth comprises hard alloy.

3. The bandsaw blade according to claim 1, wherein the first height, the second height, the third height, the fourth height and the fifth height are sequentially decreased in an arithmetic progression.

4. The bandsaw blade according to claim 1, wherein the width of the top plane of the first sawtooth of the first sub-tooth group is equal to 20-30% of the thickness of the saw blade.

5. The bandsaw blade according to claim 1, wherein the width of the top plane of the first sawtooth of the second sub-tooth group is equal to 60-70% of the thickness of the saw blade.

6. The bandsaw blade according to claim 1, wherein the first sawtooth of the third sub-tooth group is not provided with chamfer.

7. The bandsaw blade according to claim 1, wherein none of the second and third sawteeth of the first sub-tooth group and the second and third sawteeth of the third sub-tooth group is provided with chamfer.

8. The bandsaw blade according to claim 1, wherein all the chamfers are chamfers of 45 degrees; and the widths of the chamfers of the second and third sawteeth of the second sub-tooth group are ½ of the tooth set.

9. The bandsaw blade according to claim 1, wherein a rear angle of the sawtooth is between 10 and 30 degrees; and a rake angle of the sawtooth is between 0-15 degrees.

10. The bandsaw blade according to claim 1, wherein the bandsaw blade adopts fixed tooth pitch or variable tooth pitch.

11. The bandsaw blade according to claim 1, wherein the width of the top plane of the first sawtooth of the first sub-tooth group is equal to 25% of the thickness of the saw blade.

12. The bandsaw blade according to claim 1, wherein the width of the top plane of the first sawtooth of the second sub-tooth group is equal to 66% of the thickness of the saw blade.

13. The bandsaw blade according to claim 1, wherein a rear angle of the sawtooth is 25 degrees; and a rake angle of the sawtooth is 10 degrees.

* * * * *